No. 692,843. Patented Feb. 11, 1902.
W. C. FREE.
SHUTTLE DRIVING MECHANISM.
(Application filed May 27, 1901.)
(No Model.) 2 Sheets—Sheet 1.

Witnesses:
J. H. Glendening
H. S. Gaither

Inventor:
William C. Free.
By L. L. Morrow,
Atty.

THE NORRIS PETERS CO., PHOTO-LITHO., WASHINGTON, D. C.

No. 692,843. Patented Feb. 11, 1902.
W. C. FREE.
SHUTTLE DRIVING MECHANISM.
(Application filed May 27, 1901.)
(No Model.) 2 Sheets—Sheet 2.
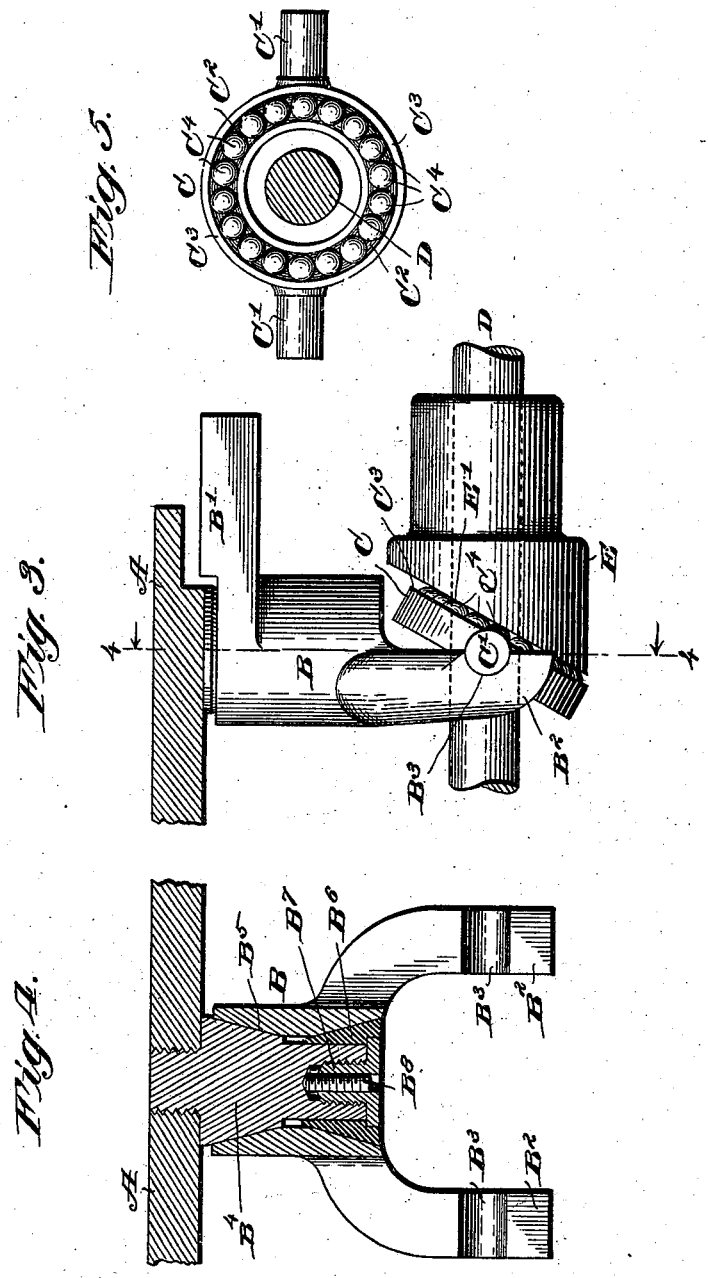
Witnesses: Inventor:
J. H. Glendening William C. Free.
H. S. Gaither By L. L. Morrison, Atty.

UNITED STATES PATENT OFFICE.

WILLIAM C. FREE, OF CHICAGO, ILLINOIS.

SHUTTLE-DRIVING MECHANISM.

SPECIFICATION forming part of Letters Patent No. 692,843, dated February 11, 1902.

Application filed May 27, 1901. Serial No. 62,155. (No model.)

*To all whom it may concern:*

Be it known that I, WILLIAM C. FREE, a citizen of the United States of America, residing at Chicago, in the county of Cook and State of Illinois, have invented certain new and useful Improvements in Shuttle-Driving Mechanisms, of which the following is a specification.

This invention is additional to the improvements in shuttle-driving mechanisms described and claimed in the specification forming part of my application, now pending and having Serial No. 62,154, for Letters Patent of the United States; and it consists in the introduction of a ball-bearing into the shuttle-driving mechanism therein shown and described.

Figure 1:
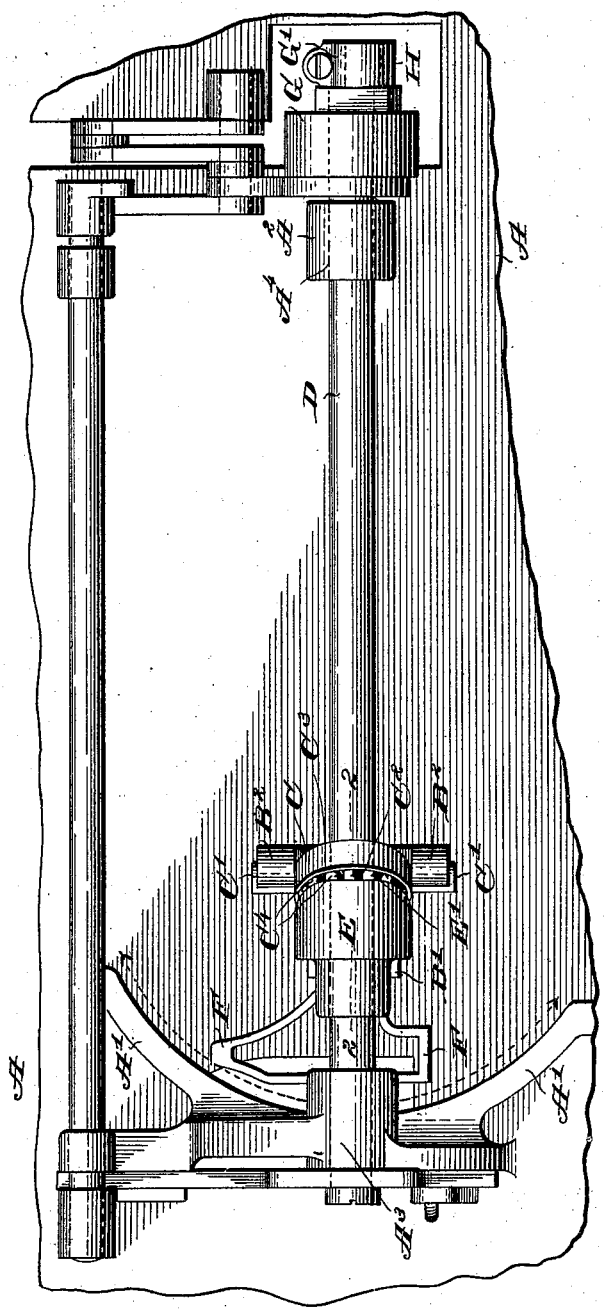
Figure 2:
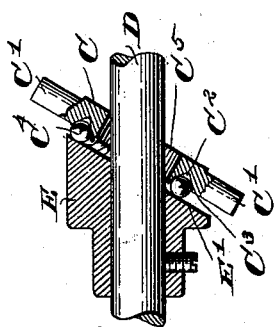

Referring to the accompanying drawings, which form a part of this specification, Figure 1 is a bottom plan view of a sewing-machine embodying my improvements. Fig. 2 is a section at the dotted line 2 2 in Fig. 1 of parts there shown. Fig. 3 is a side elevation of the shuttle-driving mechanism shown in Fig. 1. Fig. 4 is a section at the dotted line 4 4 in Fig. 3 of parts there shown. Fig. 5 is an elevation of the working face of the gimbal-ring and a cross-section of the driving-shaft of the shuttle-driving mechanism.

Like letters of reference indicate corresponding parts throughout the several views.

A is the machine base-plate, which is provided with a hanger $A'$ and a downwardly-projecting lug $A^2$, having bearings $A^3$ and $A^4$ therein to support the driving-shaft of the machine.

B is an oscillatory-shuttle-carrier driver provided at its upper end with a transversely-projecting arm $B'$ to support a shuttle-carrier and terminating at its lower end in bifurcations $B^2$, having transverse bearings $B^3$ therein and mounted on a supporting-pivot $B^4$, extending from the base-plate A longitudinally downward through a tubular bearing $B^5$ therein. The upwardly-tapering bushing $B^6$, bushing-retaining screw $B^7$, and set-screw $B^8$ serve to retain the oscillatory-shuttle-carrier driver B on its supporting-pivot $B^4$.

C is a gimbal-ring mounted, by means of trunnions $C'$ thereon, in bearings $B^3$ in the shuttle-carrier driver B and having an annular race $C^2$ sunk into the working face $C^3$ thereof.

$C^4$ represents, preferably, hardened-steel balls of suitable diameter arranged, as here shown, in a circle in the annular race $C^2$ in the working face $C^3$ of the gimbal-ring C, and taken collectively they constitute a ball-bearing interposed between such gimbal-ring C and a part to be described hereinafter.

D is a driving-shaft passing through an opening $C^5$ in the gimbal-ring C and mounted in the bearings $A^3$ and $A^4$ in the hanger $A'$ and lug $A^2$, respectively.

E is a collar fast to the driving-shaft D, having an inclined driving-face $E'$ thereon substantially parallel to and in contact with the ball-bearing $C^4$, interposed between such collar E and the working face of the gimbal-ring C.

Obviously the race $C^2$ might be formed in the inclined face $E'$ in the collar E or partly in such collar E and partly in the gimbal-ring C; but a ball-bearing interposed between the gimbal-ring C and inclined face $E'$ on the collar E and retained therein in any manner would evidently be within the spirit and scope of my invention. I therefore do not wish to be understood as intending to limit myself to the employment of a ball-bearing between those parts of any particular form or construction.

F is a shuttle-carrier of any desired form and construction secured to or integral with the shuttle-carrier-driver arm $B'$.

G is a wrist-wheel fast to the driving-shaft D and provided with a wrist-pin G.

H is an eccentric-rod connecting the wrist-pin $G'$ of the wrist-wheel G with an eccentric (not shown) on the main shaft (also not shown) of the machine.

The remaining unlettered parts shown in Fig. 1 belong to the feeding mechanism of the machine and are fully shown and described in the application mentioned in the second paragraph of this specification. Said unlettered parts need not be regarded in order to fully understand the invention herein described and claimed.

Each rotation by the driving-shaft D of the collar E, acting upon and through the gimbal-ring C, will drive the shuttle-carrier $E^2$ through a complete oscillation or back-and-forth movement, as indicated by the double arrow in Fig. 1.

What I claim as new, and desire to secure by Letters Patent, is—

1. In a sewing-machine, in combination, an oscillatory-shuttle-carrier driver, a gimbal-ring mounted in bearings therein, a shaft passing through the opening in the gimbal-ring, a collar—fast to the shaft—having an inclined face thereon substantially parallel to the adjacent face of the gimbal-ring, a ball-bearing interposed between the inclined face of the collar and the adjacent face of the gimbal-ring, and means for driving said shaft, substantially as and for the purpose specified.

2. The combination, with an oscillatory-shuttle-carrier driver, of a gimbal-ring, mounted in bearings therein and having an annular race sunk into the working face thereof, a series of balls arranged in said annular race, a shaft passing through the opening in the gimbal-ring, a collar—fast to the shaft—having an inclined driving-face thereon substantially parallel to, and in contact with, the balls in the race in the gimbal-ring, and means for driving the shaft, substantially as and for the purpose specified.

3. The combination, with an oscillatory-shuttle-carrier driver mounted on a pivot terminating at its lower end in bifurcations having transverse bearings therein, of a gimbal-ring, mounted in the transverse bearings in the shuttle-carrier driver and having an annular race sunk into the working face thereof, a circular row of balls arranged in said race, a shaft passing through the opening in the gimbal-ring, a collar—fast to the shaft—having an inclined driving-face thereon substantially parallel to and contacting the row of balls in the race in the gimbal-ring, and means for driving the shaft, substantially as and for the purpose specified.

4. In a sewing-machine, in combination, a base-plate, an oscillatory-shuttle-carrier driver mounted on a pivot on the base-plate provided, at its upper end, with a transversely-projecting arm to support a shuttle-carrier, and terminating, at its lower end, in bifurcations having transverse bearings therein, a gimbal-ring, mounted in the transverse bearings in the shuttle-carrier driver and having an annular race sunk into the working face thereof, a circular row of balls arranged in said race, a shaft passing through the gimbal-ring, a collar—fast to the shaft—having an inclined driving-face thereon substantially parallel to and in contact with the row of balls in the race in the gimbal-ring, and a shuttle-carrier secured to the transversely-projecting arm on the shuttle-carrier driver, substantially as and for the purpose specified.

In testimony whereof I have signed my name to this specification in the presence of two subscribing witnesses.

WILLIAM C. FREE.

Witnesses:
RICHARD F. LOCKE,
NELLIE BUNKER.